United States Patent [19]

Lynn

[11] 4,325,561

[45] Apr. 20, 1982

[54] NESTING PATIENT TRANSPORT TABLES

[76] Inventor: Gary S. Lynn, 8119 Forest Ave., Munster, Ind. 45215

[21] Appl. No.: 131,204

[22] Filed: Mar. 17, 1980

[51] Int. Cl.³ .............................................. B62D 39/00

[52] U.S. Cl. .................................... 280/33.99 R; 5/8; 5/11; 108/91

[58] Field of Search ................. 280/33.99 C, 33.99 A, 280/33.99 R, 33.99 S, 33.99 H; 296/20; 5/8, 11, 60, 62, 64, 67, 425, 429; 248/163; 297/234, 239; 108/91; 312/250; 186/52, 62; 188/19

[56] References Cited

U.S. PATENT DOCUMENTS

| | | | |
|---|---|---|---|
| 1,694,172 | 12/1928 | Gallowitz | 296/20 |
| 1,750,199 | 3/1930 | Spahn | 248/163 X |
| 2,785,906 | 3/1957 | Matter | 188/19 X |
| 2,853,716 | 9/1958 | Sevick | 5/8 |
| 2,903,269 | 9/1959 | Hennion | 280/33.99 |
| 3,118,684 | 1/1964 | Kappen | 280/33.99 |
| 3,797,052 | 3/1974 | Licina | 5/64 X |
| 4,018,449 | 4/1977 | Anderson | 280/33.99 C |
| 4,052,097 | 10/1977 | Weil et al. | 296/20 |

FOREIGN PATENT DOCUMENTS

| | | | |
|---|---|---|---|
| 591234 | 12/1933 | Fed. Rep. of Germany | 108/91 |
| 1323689 | 3/1963 | France . | |

*Primary Examiner*—David M. Mitchell
*Assistant Examiner*—D. W. Underwood
*Attorney, Agent, or Firm*—Andrew S. Neely

[57] ABSTRACT

The specification discloses a nestable transport table 10 having a table top 14. Front legs 20 and 22 extend downwardly from the under side of the table top 14 and are spaced inwardly from the lateral edges thereof. Rear legs 34 and 36 extend outwardly and then downwardly from the rear end of the table top 14 so that the rear legs 34 and 36 are spaced outwardly from the lateral edges of the table top 14. Telescoping members 38 and 40 extend downwardly from the lower ends of the rear legs 34 and 36 and are movable between a retracted position and an extended position. In the extended position, the telescoping members 38 and 40 may be locked to place the transport table 10 in a tilted nesting position. Wheels 26, 28, 42, and 44 are mounted at the lower ends of legs 20 and 22 and the lower ends of the telescoping members 38 and 40.

20 Claims, 5 Drawing Figures

NESTING PATIENT TRANSPORT TABLES

FIELD OF INVENTION

The present invention relates to patient transport tables and, particularly, relates to a patient transport table that is adapted to be nested together with a like transport table for easy storage in a minimum of space.

BACKGROUND OF THE INVENTION

Patient transport tables have become standard equipment for most hospitals. Such patient transport tables are mounted on wheels and are used to transport patients from their individual rooms to operating rooms, intensive care units, or another rooms or areas of the hospital. Because of their frequent use, patient transport tables are usually kept on almost every floor of a hospital, and on occasions, transport table traffic jams occur when numerous tables are left in hospital hallways after a patient is removed from the table.

Patient transport tables are typically in use less than twenty (20%) percent of the time and must be stored for the remaining period of time. Usually, the hallways and storage areas of a hospital can easily accomodate one or two patient transport tables. A problem arises, however, when an excessive number of transport tables are left on a particular floor or in a particular storage area. For example, transport tables may accumulate near the operating room during a period of frequent operations. Hospital personnel may have more pressing matters to command their attention than the job of removing transport tables. Thus, a need has arisen for a patient transport table that is easily and efficiently stored with other patient transport tables.

The present invention solves this problem by providing a nestable patient transport table. When numerous patient transport tables accumulate in a hospital hallway, the transport tables of the present invention may be adjusted into the nesting position, and two or more tables may then be nested together in a space-saving configuration. For example, using patient transport tables of the present invention, approximately six (6) tables may be nested together in the space occupied by two (2) conventional tables. In this manner, although numerous tables are present in the hallway, the space needed to store them is reduced by nesting them together.

SUMMARY OF THE INVENTION

The aforementioned problem associated with transport tables is solved by the present invention which provides for a nestable transport table. A generally planar table top is provided having first and second opposing ends. The first leg structure extends downwardly from the first end of the table top for supporting the table above the floor, and a second leg structure extends downwardly from the second end of the table top, also, for supporting it above the floor. Adjustment structure is provided for selectively adjusting the position of the table top between a generally horizontal service position and a tilted nested position so that the second end of the table top is above the first end thereof when in the tilted nesting position. The second leg structure is adapted to receive a first leg structure of a like transport table when said second leg structure is in the nesting position. In order to place two transport tables in a nested together position, the transport tables are first placed in a nesting position and then the first end of one table top is inserted through the second leg structure and beneath the second end of the table top of another transport table. The two transport tables are urged together until the upper side of one table top engages the underside of the other. Wheels are mounted on the lower ends of the first and second leg structures so that the transport tables may be rolled about.

In accordance with a particular embodiment of the present invention, the transport table includes a generally rectangular table top having front and rear ends and having two lateral sides extending between the front and rear ends. A pair of front legs extend downwardly from the underside of the front end of the table top and are spaced inwardly from the lateral sides thereof. A pair of rear legs extend outwardly from beneath the rear end of the table top in a lateral direction and then extend in a downwardly spaced-apart relationship so that the rear legs are positioned outwardly from the lateral sides of the table top. A pair of telescoping members are provided with one of the telescoping members extending from the bottom of each of the rear legs. The telescoping members operate between a retracted position and an extended position. When the telescoping members are in the retracted position, the table top is maintained in a generally horizontal service position. When the telescoping members are placed in the extended position, the table top is placed in the tilted nesting position. A catch is mounted on each of the rear legs for engaging the telescoping members to lock the telescoping members in the extended position, and wheels are mounted on the lower ends of the front legs and the lower ends of the telescoping members so that the transport table may be rolled about.

To place the transport tables in a nested together position with other like transport tables, the rear end of the table top is raised allowing the telescoping members to gravity-feed from the bottom of the rear legs. When the telescoping members reach the extended position, the catch locks the telescoping members so that when the table top is released, the telescoping members cannot be forced back into the rear legs. Then, the front end of one table top is rolled between the rear legs of another like transport table. The two transport tables are urged together until the upper side of one table top engages the underside of another table top.

Brakes are mounted on the lower ends of the telescoping members for selectively engaging the wheels on the lower end thereof. A cable wire is connected to each of the brakes and the cable wires extend through the telescoping members and through the rear legs to the table top. The cable wires are conventional in design and include a filament wire disposed within a flexible, non-compressible, tubular cable. The cable wires have sufficient length or slack so as to not interfere with the movement of the telescoping members between the extended and the retracted positions. A brake hand lever is mounted on the table top and is connected to the cable wires. When the hand lever is depressed, the filament wires within the cables are pulled and, thus, the brakes are actuated to engage the wheels. A locking loop or hook is attached to the table top to hold the hand lever in the depressed position.

BRIEF DESCRIPTION OF THE DRAWING

The present invention may best be understood by reference to the following Detailed Description when taken in conjunction with the Drawings in which.

DETAILED DESCRIPTION

Figures 1, 2, 3, 4, 5:
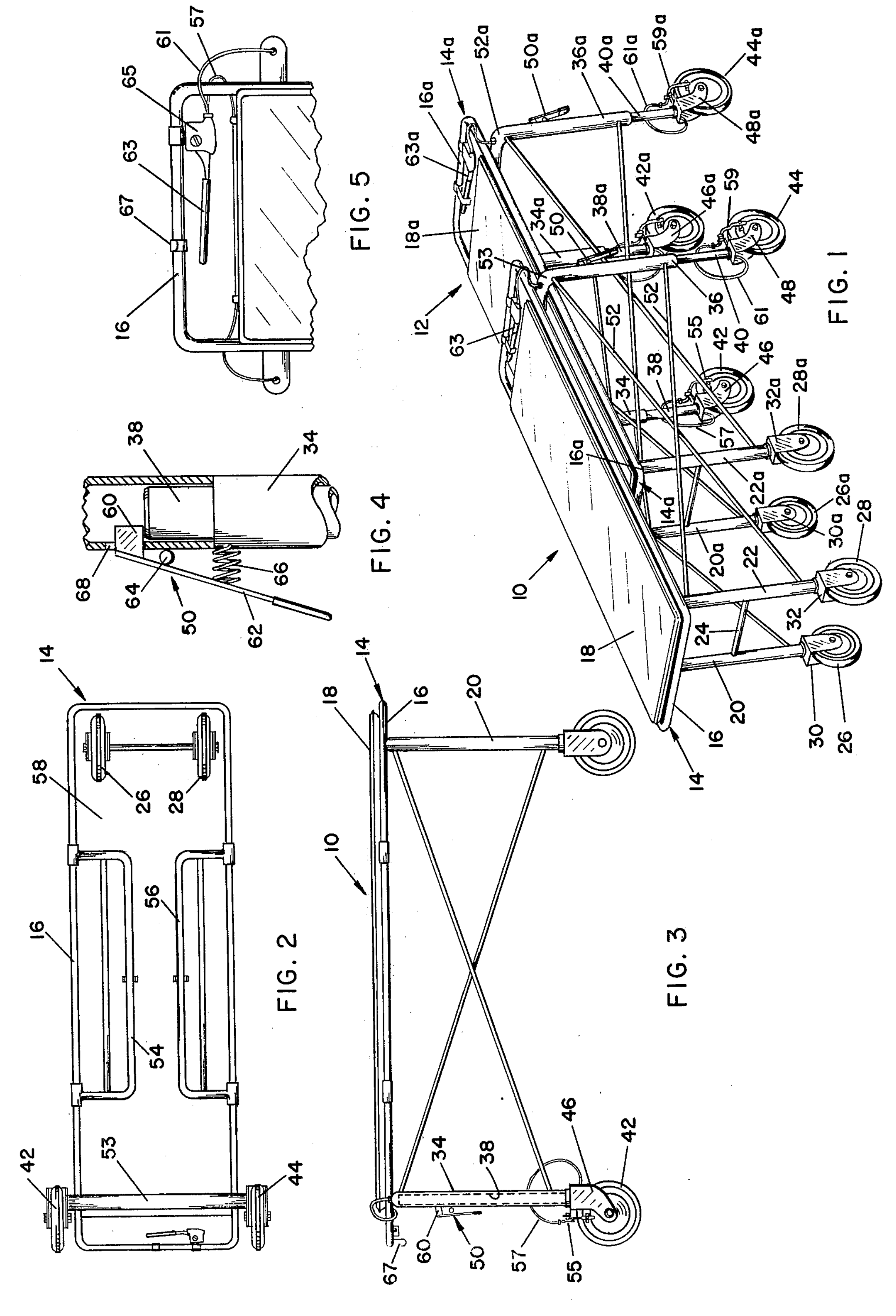
FIG. 1 shows two nestable transport tables of the present invention in which each of the transport tables is in the nesting position, and the two transport tables are nested together in a space-saving configuration.
FIG. 2 is a view of the underside of the nestable transport table.
FIG. 3 is a side view of the nestable transport table.
FIG. 4 is a somewhat diagrammatical view of the catch that is used to lock the nestable transport table in the nesting position.
FIG. 5 is a detail view of the brake hand lever used to actuate the brakes of the transport table.

Referring now to the drawings in which like reference characters designate like or corresponding parts throughout the several views, there is shown in FIG. 1 a pair of nestable transport tables 10 and 12. Each of the transport tables 10 and 12 is individually in the nesting position, and the two tables are nested together for storage. As will hereinafter be described in more detail, the transport tables 10 and 12 may be moved to a service position in which the tables are used to transport patients about a hospital.

The transport table 10 includes a generally rectangular table top 14 that is formed, in part, by a perimeter bar 16 extending about the perimeter of the top 14 and a cushioned surface 18 on which a patient may be supported. A pair of front legs 20 and 22 extend downwardly from beneath the table top 14 and are disposed inwardly from the perimeter bar 16. For reference purposes only, the end of transport table 10 adjacent the front legs 20 and 22 is referred to as the front end, and the opposing end of the transport table is the rear end. The sides of the transport table extending between the front and rear ends thereof are referred to as the lateral sides. Thus, the legs 20 and 22 are disposed inwardly from the lateral sides of the table top 14 and near the front end thereof.

For strength, a cross-brace 24 is affixed between the midsections of the front legs 20 and 22. A pair of wheels 26 and 28 are mounted on the lower end of the front legs 20 and 22, respectively, using wheel mounts 30 and 32, respectively. In the preferred embodiment, the wheels 26 and 28 are permanently oriented in a direction parallel to the length of the transport table 10, but it will be appreciated that it would also be feasible to use caster wheels on the front legs 20 and 22.

Referring now to the rear end of the transport table 10, a pair of rear legs 34 and 36 extend therefrom. The rear legs 34 and 36 extend outwardly from beneath the rear end of the table top 14 in a transverse or lateral direction perpendicular to the length of the transport table 10. Then, the legs 34 and 36 curve and extend downwardly so that the rear legs are disposed outwardly from the perimeter bar 16 along the lateral edge of the table top 14.

Telescoping members 38 and 40 extend out of the lower end of the rear legs 34 and 36. The rear legs 34 and 36 are hollow to receive the telescoping members 38 and 40 so that the telescoping members are movable between an extended position as shown in FIG. 1 and a retracted position in which the telescoping members 38 and 40 are disposed in substantially entirely within the rear legs 34 and 36.

A pair of wheels 42 and 44 are mounted on the lower ends of the telescoping members 38 and 40, respectively, using caster wheel mounts 46 and 48. The caster wheel mounts 46 and 48 are attached to the lower ends of the telescoping members 38 and 40 in a conventional pivoting manner so that the wheels 42 and 44 automatically orient themselves in the direction in which the rear legs 34 and 36 are urged by an operator.

A catch 50 is attached to the side of the rear leg 36 and functions to lock the telescoping member 40 in the extended position as shown in FIG. 1. A like catch is provided on leg 34 for locking the telescoping member 38 in an extended position. The construction and operation of catch 50 is hereinafter described in greater detail.

Cross-braces 52 extend between front leg 22 and rear leg 36, and between front leg 20 and rear leg 34. The cross-braces 52 provide strength and rigidity for the front and rear legs of the transport table 10 and do not interfere with the nesting function of the transport tables. It will be appreciated that the cross-braces 52 may be eliminated for light duty transport table or where the front legs 20 and 22 and the rear legs 34 and 36 are sufficiently strong for an intended purpose without cross-braces 52.

The transport table 12 is identical in every respect to the transport table 10. The corresponding parts or portions of transport table 12 are designated by the same reference character as used for transport table 10 with the letter "a" following the reference character for the purposes of distinguishing between the two tables.

To move the transport tables 10 and 12 into the nested together position as shown in FIG. 1, the transport tables must first be adjusted individually to the nesting position. To accomplish this adjustment in the transport table 10, the rear end thereof is raised. As the rear end of the table 10 is raised, the telescoping members 38 and 40 are gravity-fed out of the legs 34 and 36. When the telescoping members 38 and 40 reach the extended position, the catches 50 will operate to lock the telescoping members in such extended position. When both transport beds 10 and 12 are in the nesting position, the front end of the transport table 12 is inserted beneath the rear end of the transport table 10. As a result of the outward spacing of the rear legs 34 and 36 relative to the lateral edges of the transport table 10, the front legs **20*a* and 22*a* may easily pass between the rear legs 34 and 36 of the transport table 10, and, likewise, the perimeter bar 16*a* at the front end of the transport table 12 is able to pass between the rear legs 34 and 36 of the table 10. To place the transport tables 10 and 12 in a fully nested position, the tables are urged together as shown in FIG. 1 until the upper side (the cushioned surface 18*a*) engages the underside of the table top 14 of the transport table 10**.

Referring now to the lower ends of the telescoping members 38 and 40, it is shown in FIG. 1 that brakes 55 and 59 are mounted thereon. The brakes 55 and 59 are similar in operation and construction to brakes commonly found on bicycles and the like. When the brakes are actuated, brake pads on either side of the wheels 42 and 44 are forced against the rims of the wheels. The brakes 55 and 59 are actuated in a conventional manner by cable wires 57 and 61. The cable wires 57 and 61 include a filament cable disposed within a tubular, noncompressible, flexible cable. The filament wire within the cable may move axially with respect to the cable.

The cable wires 57 and 61 extend upwardly through the telescoping members 38 and 40 and the rear legs 34 and 36, and exit the rear legs 34 and 36 through appropriate apertures. The cable wires 57 and 61 are then connected to a brake hand lever 63 which operates in a conventional manner to actuate brakes 55 and 59.

The operation of a brake hand lever 63 is more clearly shown in FIG. 5. In this view, it may be seen that the hand lever 63 is mounted on the perimeter bar 16 by a lever housing 65. The brake hand lever 63 is similar in operation to the hand levers normally found on bicycles for actuating brakes, except that the lever 63 is elongated so that the operator of the transport table 10 may use both hands on the lever 63 to actuate the brakes 55 and 59. The cable wires 57 and 61 are connected side by side at approximately the same position on the brake housing 65. When the lever 63 is depressed, the filament wires within the cable wires 57 and 61 are pulled and, thus, actuate the brakes 55 and 59 in a conventional fashion.

A locking loop or hook 67 is also mounted on the perimeter bar 16. The hook 67 is free to rotate on the perimeter bar 16, and when not in use, the hook 67 hands vertically out of the way. However, if it is desired to maintain the hand brake lever 63 in the depressed condition to hold the brakes 55 and 59 in the actuated or braking position, the hook 67 may be looped over the lever 63 to hold it in the depressed position. This use of the hook 67 is shown in FIG. 1.

In order to allow the telescoping members 38 and 40 to extend between an extended position and a retracted position out of the rear legs 34 and 36, the cable wires 57 and 61 must be sufficiently long or have sufficient slack so as to not interfere with this operation. This length or slack may be provided as shown in FIG. 1 by looping the cable wires 57 and 61 at the lower end of the telescoping members 38 and 40. A similar loop could be provided at the top of the rear legs 34 and 36, or the cable wire could be coiled within the rear legs of the transport table 10 to provide the necessary slack.

Referring now to FIG. 2, there is shown an underside view of the transport table 10. In this view, the position of the wheels 26, 28, 42, and 44 and, thus, the corresponding legs are clearly shown. It will be appreciated that the wheels 26 and 28 are spaced inwardly from the lateral sides of table top 14 within the perimeter bar 16, and the rear wheels 42 and 44 are spaced outwardly from the perimeter bar 16 along the lateral edges of the transport table 10.

In FIG. 2, a transverse bar 53 is shown extending across the width of the transport table 10 between the rear wheels 42 and 44. This transverse bar 53 is mounted on the underside of the perimeter bar 16 and is partially shown in FIG. 1. In the preferred embodiment, the transverse bar 53 is actually a continuation of the rear legs 34 and 36. In this construction, the legs 34 and 36 and the bar 53 are constructed of a single section of tubular steel having two right angle bends so that the two legs 34 and 36 are formed on the opposite ends of the steel section, and the transverse bar 53 is the midsection thereof. The transverse bar 53, in the preferred embodiment, is welded to the perimeter bar 16, but any appropriate conventional attachment device may be used.

Also shown in FIG. 2 are a pair of retaining rails 54 and 56 that are pivotally mounted on the perimeter bar 16. In FIG. 2, the retaining rails 54 and 56 are flush against the underside of the table top 14 and are in the storage position. These retaining rails 54 and 56 may be rotated 270° to an upright position for the purpose of retaining a patient on the upper side of the table top 14.

A planar metal top 58 is dimensioned to fit over and extend between the perimeter bar 16. The top 58 may be welded, rivetted or otherwise fastened to the upper side of the perimeter bar 16 to form the support surface of the table top 14. It will be appreciated that other materials such as plastic, fiberglass, wood, etc. may be substituted for the metal top 58.

Referring now to FIG. 3, a side view of the transport table 10 is shown. In this view, the telescoping member 38 is shown using dashed lines within the rear leg 34. The outside diameter of the telescoping member 38 is slightly smaller than the inside diameter of the tubular leg 34 so that the member 38 is free to slide up and down within the leg 34. When the rear end of the transport table 10 is raised, the telescoping member 38 will be gravity-fed out of the leg 34. When the telescoping member 38 reaches the desired extended position, a plunger 60 moves into the interior of the leg 34 and prevents the upward return of the telescoping member 38 into the leg 34. In this manner, the telescoping member 38 is locked in the extended position.

Referring now to FIG. 4, a somewhat diagrammatical view of catch 50 is shown to illustrate the operation thereof. In this view, the leg 34 is broken away, in part, to show the interaction of the telescoping member 38 and the catch 50. The telescoping member 38 is shown in the extended position, and the catch 50 is in the locked position. The catch 50 includes a rocker arm 62 that pivots about a pivot rod 64 that is mounted on the side of the leg 34. A compression spring 66 is mounted between the leg 34 and the lower portion of the rocker arm 62 below the pivot rod 64. The plunger 60 is mounted on the upper end of the rocker arm 62, and in the locked position, the plunger 60 extends through an aperture 68 formed in the side of the leg 34.

The plunger 60 extending within the leg 34 blocks the upward travel of the telescoping member 38. Thus, the member 38 is locked in the extended position. To release the member 38, the lower end of the rocker arm 62 is compressed, and the rocker arm 62 rotates about the pivot rod 64 until the plunger 60 is withdrawn from the leg 34. At this point, the weight of the transport table 10 will force the leg 34 downwardly, and, thus, the telescoping member 38 will travel up the leg 34.

The spring 66 continuously biases the lower portion of the rocker arm 62 outwardly. The arm 62 is fastened at the pivot rod 64 so that the outward pressure of the spring 66 continuously forces the plunger 60 inwardly. When the telescoping member 38 is in the retracted position, the plunger 60 will engage and slide along the surface of the member 38. When the member 38 is moved to the extended position, the plunger 60 will automatically move into the locked position.

Referring again to FIG. 3, the transport table 10 is shown in the service position in which the table is used for transporting or otherwise supporting patients. It will be appreciated that in the service position, the telescoping member 38 is fully disposed within the leg 34, and the lower portion of the leg 34 directly engages the caster wheel mount 46. This embodiment is preferred since there is no catch or latch that may release and suddenly drop one end of the patient transport table 10 while a patient is on the table and the table is in a service position.

However, it is recognized that a variation of the present invention may be achieved by telescopically lowering the front end of the transport table 10 instead of telescopically raising the rear end of the table. However, this alternate embodiment is not preferred since such an embodiment would inherently require that a catch or lock be used to secure the transport table 10 in the service position. If such catch or lock failed, then the front end of the transport table 10 would suddenly drop, and possibly cause injury to a patient on the transport table.

The present invention is constructed of conventional materials. Thus, the wheels, such as wheels 26, 28, 42, and 44, are pneumatic wheels supported on axles by ball-bearings. Most of the structural elements of the invention, such as front legs 20 and 22, rear legs 34 and 36, transverse bar 53, cross-brace 24, cross-brace 52, and telescoping rods 38 and 40, are constructed of tubular steel. This is the conventional material used to construct transport tables, but it is recognized that other materials may be suitable for construction of the present invention.

Although a particular embodiment of the present invention has been described in the foregoing Detailed Description, it will be understood that the invention is capable of numerous rearrangements, modifications, and substitutions of parts without departing from the spirit of the invention.

I claim:

1. A transport table for being nested together with like transport tables for storage, comprising:

a generally planar table top having first and second opposing ends;

first leg structure extending downwardly from the first end of said table top for supporting said table top above the floor;

second leg structure extending downwardly from the second end of said table top for supporting said table top above the floor;

adjustment means for selectively adjusting the relative lengths of said first and second leg structures to adjust the position of the table top between a generally horizontal service position and a tilted nesting position, the second end of said table top being above the first end of said table top when in the tilted nested position; and said second leg structure being adapted to receive said first leg structure of a like transport table when in the tilted nesting position so that the like transport table may be nested within and beneath said transport table by inserting the first end of said table top of the like table top of the like transport table through said second leg structure of said transport table.

2. A transport table for being nested together with like transport tables for storage, comprising:

a generally planar table top having first and second opposing ends;

first leg structure extending downwardly from the first end of said table top for supporting said table top above the floor;

second leg structure extending downwardly from the second end of said table top for supporting said table top above the floor;

at least one telescoping member attached to said second leg structure for telescopically extending therefrom to elevate the second end of said table top to position said table top in a tilted nesting position, said telescoping member being operable to selectively adjust the position of the table top between a generally horizontal service position and the tilted nesting position, the second end of said table top being above the first end of said table top when in the tilted nesting position; and said second leg structure being adapted to receive said first leg structure of a like transport table and the first end of said table top of the like transport table when in the tilted nesting position so that the like transport table may be nested within and beneath said transport table by inserting the first end of said table top of the like transport table through said second leg structure of said transport table.

3. The transport table of claim 1 wherein said second leg structure comprises a pair of legs spaced sufficiently apart so that said first leg structure of a like transport table and said first end of said table top of a like transport table may pass between said pair of legs.

4. A transport table for being nested together with like transport tables for storage, comprising:

a generally planar table top having first and second opposing ends;

first leg structure extending downwardly from the first end of said table top for supporting said table top above the floor;

second leg structure extending downwardly from the second end of said table top for supporting said table top above the floor, said second leg structure including a pair of legs spaced sufficiently apart so that said first leg structure of a like transport table and said first end of said table top of a like transport table may pass between said pair of legs;

a pair of telescoping members, one of said telescoping members being selectively extendable from each of said legs of said second leg structure between a retracted position and an extended position, said table top being in a generally horizontal service position when said telescoping members are placed in the retracted position and being in a tilted nesting position when said telescoping members are placed in the extended position, the second end of said table top being above the first end of said table top when in the tilted nesting position; and said second leg structure being adapted to receive said first leg structure of a like transport table and the first end of said table top of the like transport table when in the tilted nesting position so that the like transport table may be nested within and beneath said transport table by inserting the first end of said table top of the like transport table through said second leg structure of said transport table.

5. The transport table of claim 4 further comprising a catch for engaging said telescoping members to lock said telescoping members in the extended position.

6. The transport table of claim 1 further comprising a plurality of wheels affixed to the lower ends of said first and second leg structures.

7. The transport table of claim 1 further comprising:

a plurality of wheels mounted on the lower ends of said first and second leg structures for supporting the transport table on a surface and for rolling on the surface;

a brake mounted adjacent at least one of said wheels for selectively engaging said wheels to resist the rolling motion of said wheel; and a brake actuator mounted adjacent said planar top and connected to said brake for being operated by an operator to selectively urge said brake against said wheel.

8. A transport table for being nested together with like transport tables comprising:

a generally rectangular table top having front and rear ends and having two lateral sides extending between the front and rear ends;

a pair of front legs extending downwardly from the underside of the front end of said table top and being spaced inwardly from the lateral sides thereof;

a pair of rear legs extending outwardly from beneath the rear end of said table top in a lateral direction and then extending downwardly in a spaced apart relationship so that said rear legs are positioned outwardly from the lateral sides of said table top; and adjustment means for selectively adjusting the relative lengths of said front and rear legs to adjust the position of the table top between a generally horizontal service position and a tilted nesting position, the front end of said table top being disposed at a lower position relative to the rear end thereof in the nesting position so that two or more transport tables may be nested together by adjusting the transport tables into the nesting position and moving the front legs of a first transport table through the rear legs of a second transport table and urging the two transport tables together until the table top of the first transport table engages the underside of the table top of the second transport table.

9. A transport table for being nested together with like transport tables comprising:

a generally rectangular table top having front and rear ends and having two lateral sides extending between the front and rear ends;

a pair of front legs extending downwardly from the underside of the front end of said table top and being spaced inwardly from the lateral sides thereof;

a pair of rear legs extending outwardly from beneath the rear end of said table top in a lateral direction and then extending downwardly in a spaced apart relationship so that said rear legs are positioned outwardly from the lateral sides of said table top;

a pair of telescoping members, one of said telescoping members extending from the bottom of each of the rear legs between a retracted position and an extended position, said table top being in a generally horizontal service position when said telescoping members are in the retracted position and said table top being in a tilted nesting position when said telescoping members are in the extended position, the front end of said table top being disposed at a lower position relative to the rear end thereof in the nesting position so that two or more transport tables may be nested together by adjusting the transport tables into the nesting position and moving the front legs of a first transport table through the rear legs of a second transport table and urging the two transport tables together until the table top of the first transport table engages the underside of the table top of the second transport table.

10. The transport table of claim 9 further comprising a catch mounted on each of said rear legs for engaging said telescoping member to lock said telescoping member in the extended position.

11. The transport table of claim 10 further comprising a spring mounted on said catch to continuously bias said catch to lock the telescoping member in the extended position so that the table top may be adjusted to the nesting position by raising the rear end of the table top, allowing the telescoping members to gravity-feed from the lower ends of the rear legs until the spring-biased catch is in position to automatically lock the telescoping members in the extended position.

12. The transport table of claim 9 wherein said catch on each leg comprises:

an aperture formed in said rear leg;

a plunger positioned within said aperture for being selectively moved into and out of the interior of said leg, said plunger being operable to selectively engage the upper end of said telescoping member to lock said telescoping member in the extended position;

a pivot attached to the exterior of said leg adjacent to said aperture;

a rocker arm attached to said pivot and to said plunger and being operable to rock about the pivot to move the plunger into and out of said rear leg; and a spring attached between said rocker arm and said rear leg to bias said rocker arm to continuously urge said plunger into said rear leg.

13. The transport table of claim 9 further comprising:

wheels mounted on the lower ends of said front legs; and caster wheels mounted on the lower ends of said telescoping members extending from said rear legs so that said transport table is supported on said wheels and caster wheels.

14. The transport table of claim 8 further comprising retaining rails pivotally attached adjacent to the lateral edges of said table top, said retaining rails being movable between an upright position extending above the table top and a horizontal storage position in which the retaining rails are flush against the underside of said table top, said retaining rails being positioned in the horizontal storage position to allow nesting of a transport table beneath said retaining rails.

15. The transport table of claim 8 further comprising cross-braces extending below the lateral sides of said table top between said front and rear legs.

16. The transport table of claim 8 further comprising:

a plurality of wheels mounted on the lower ends of said front and rear legs for supporting the transport table and rolling on a surface;

a brake mounted adjacent at least one of said wheels for selectively engaging said wheel to resist rolling motion thereof;

communication means extending between said table top and said brake for transmitting mechanical force therebetween and being extendable and retractable in response to adjustment of the relative lengths of said front and rear legs; and a brake actuator mounted adjacent said table top and connected to said communication means for being operated by an operator to selectively actuate said brake through said communication means to cause said brake to engage said wheel.

17. The transport table of claim 16 wherein said actuator comprises a hand brake lever and wherein said communication means comprises a cable wire at least partially coiled within one of said rear legs and connected between said hand brake lever and said brake, said cable wire including a wire disposed within a flexible, non-compressible, tubular cable.

18. A transport table for being nested together with like transport tables comprising:

a generally rectangular table top having front and rear ends and having two lateral sides extending between the front and rear ends;

a pair of front legs extending downwardly from the underside of the front end of said table top;

a pair of rear legs extending downwardly from the rear end of said table top and being disposed outwardly from the lateral sides of said table top;

a pair of telescoping members, one of said telescoping members extending from the bottom of each of said rear legs between a retracted position and an extended position, said table being in a generally horizontal service position when said telescoping members are in the retracted position and said table top being in a tilted nesting position with the rear end of said table top being elevated with respect to the front end thereof when said telescoping members are in the extended position, said rear legs being positioned so that the front end of said table top and the front legs of one transport table may pass between said rear legs of another of said transport table, whereby said one transport table and another transport table may be nested together;

a catch mounted on each of said rear legs for engaging said telescoping members to lock said telescoping members in the extended position; and wheels mounted on the lower ends of said front legs and said telescoping members.

19. The transport table of claim 18 further comprising:

brakes mounted on the telescoping members for selectively engaging the wheels on the lower ends thereof;

cable wires connected to actuate said brakes and extending through said telescoping members and through said rear legs to said table top;

said cable wires including filament wires disposed within flexible, non-compressible, tubular cables and being sufficiently long to extend the length of said rear legs and said telescoping members in the extended position; and a brake hand lever mounted on said table top and connected to said cable wires for selectively pulling said filament wires to actuate said brakes to urge said brakes against said wheels.

20. The transport table of claim 19 further comprising a lock for holding the lever in a depressed position to lock the brakes and prevent said wheels from rolling.

* * * * *